United States Patent [19]

Schaenzer

[11] 4,229,129
[45] Oct. 21, 1980

[54] CHAMFER TOOL

[76] Inventor: Gordon N. Schaenzer, 11737 N. Solar Avenue 77W, Mequon, Wis. 53092

[21] Appl. No.: 22,636

[22] Filed: Mar. 21, 1979

[51] Int. Cl.³ .............................................. B23D 79/08
[52] U.S. Cl. .................................... 408/228; 82/4 C;
                                                      408/211
[58] Field of Search ............... 408/201, 202, 211, 226,
                                    408/227, 228, 229; 82/4 C

[56] References Cited

U.S. PATENT DOCUMENTS

| | | | |
|---|---|---|---|
| 2,242,821 | 5/1941 | Fanslow | 408/229 |
| 2,792,728 | 5/1957 | Novosel | 408/201 |
| 2,958,241 | 11/1960 | Wahli | 408/146 |
| 3,232,145 | 2/1966 | Wilson | 408/202 |
| 3,537,338 | 11/1970 | Halpern | 408/226 X |
| 3,550,482 | 12/1970 | Lee | 408/228 |

*Primary Examiner*—Z. R. Bilinsky
*Attorney, Agent, or Firm*—Quarles & Brady

[57] ABSTRACT

A tool for chamfering the inner and outer peripheral edges of the mouth of an empty cartridge case comprising a hollow body including a cylindrical base and an integral conical head bisected by a blade-receving slot with aligned openings formed therein at its forward end tranversely of the blade-receiving slot, a replaceable V-shaped blade including inner and outer cutting edges disposed in the slot having a pair of tapered legs converging to an apex with a bore formed therethrough in alignment with the openings in the conical head, and a fastening means such as a pin extending through the aligned bore and openings for removable fastening the blade within the blade-receiving slot.

2 Claims, 7 Drawing Figures

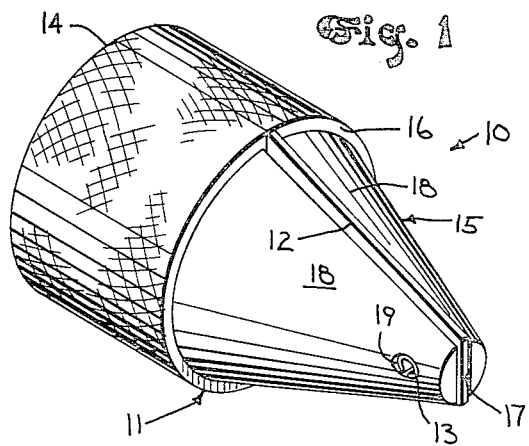
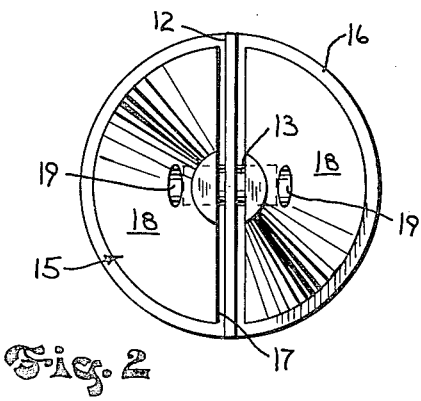
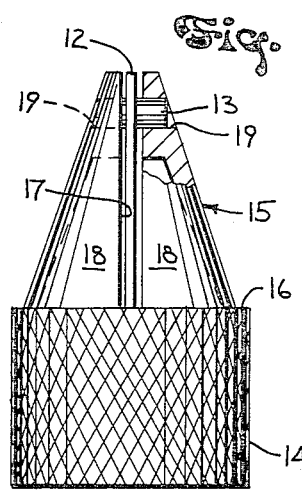
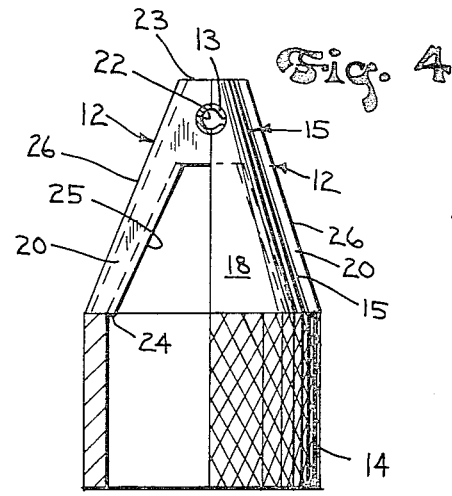
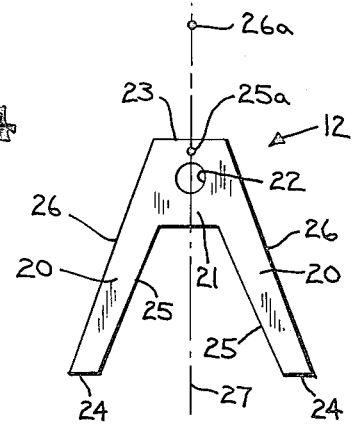
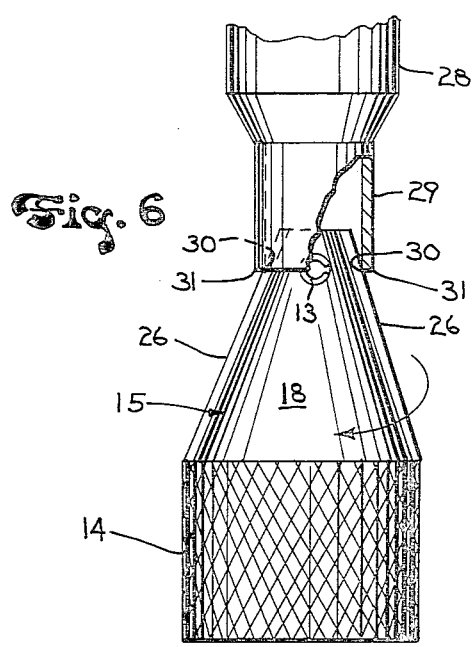
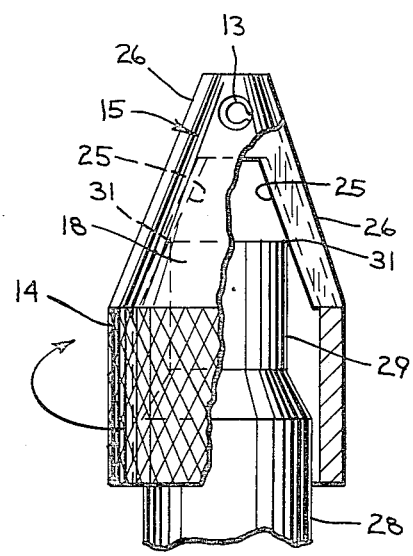

CHAMFER TOOL

BACKGROUND OF THE INVENTION

This invention relates to chamfering or reaming tools, and more particularly, to a hand-held tool for chamfering the inner and outer peripheral edges of the mouth of an empty cartridge case.

When a firearm discharges a bullet from a cartridge case, burrs may form along the inner and outer peripheral edges of the mouth of the case. If a person desires to reuse and reload the empty case, these burrs must be removed by chamfering or beveling the edges of the mouth in order that proper reloading may be insured.

The prior art has provided various forms of tools for chamfering or reaming. An example of such a tool is shown in U.S. Pat. No. 3,550,482 issued Dec. 29, 1970, to Lee entitled "Integral Chamfering Tool." This type of tool has a hollow main body together with hollow point halves that have integrally formed diametrically opposed exterior and interior cutting edges. When the tool's edges become dull from use, however, the tool must either be thrown away and replaced, or the edges must be sharpened. Due to the position of the cutting edges, the sharpening operation is difficult, expensive and time consuming to perform.

Another arrangement is shown in U.S. Pat. No. 3,232,145 issued Feb. 1, 1966, to Wilson entitled "Hand Reamer." This type of tool has a blade supporting element together with separate cutting blades which are held in position by a cylindrical housing and collar. This tool is primarily intended for beveling and deburring the inner and outer surfaces of the cut end of a hollow pipe. The reamer, however, is expensive to manufacture due to the number of parts necessary for its assembly.

Still another type of arrangement is shown in U.S. Pat. No. 2,958,241 issued Nov. 1, 1960, to Wahli entitled "Cutting Tool," and U.S. Pat. No. 2,792,728 issued May 21, 1957, to Novosel entitled "Counter-Cutting Tool." These types of tools include solid conical shaped heads which have integral cutting edges only along the exterior surface of their heads. These tools are thus only useful for reaming the interior surfaces of the end of a tubular workpiece.

A chamfer tool in accordance with the present invention employs a hollow housing with a replicable blade to provide an economical and structurally sound tool that chamfers and deburrs both the inside and outside edges of cartridge case mouths.

SUMMARY OF THE INVENTION

The present invention resides in a tool for chamfering the inner and outer peripheral edges of the mouth of an empty cartridge case comprising a hollow body including a cylindrical base and an integral conical head extending forwardly therefrom bisected by a blade-receiving slot to form a pair of opposed blade-supporting portions, a blade including inner and outer cutting edges disposed in the slot having a pair of tapered legs converging together to define an apex at the forward end of the conical head, and fastening means for removably fastening the apex of the blade to the forward end of the conical head.

In one form, the blade-supporting portions have aligned openings formed in their forward ends transversely of the blade-receiving slot, and the apex of the blade has a bore formed therethrough in alignment with the openings in the blade-supporting portions. A pin extends through the aligned bore and openings to removably fasten the blade within the blade-receiving slot. Thus, when the blade wears out it may easily be replaced with a new one by removing the pin, inserting a new blade, and then reinserting the pin.

It is an object of the invention to provide a chamfer tool which may be used to chamfer and deburr both the inner and outer peripheral edges of the mouth of a cartridge case.

It is another object of the invention to provide a chamfer tool with a blade which may easily be replaced after becoming worn and dull.

It is yet another object of the invention to provide an economical chamfer tool which has a minimal number of parts for ease in assembly.

The foregoing and other objects and advantages of the invention will appear from the following description. In the description, reference is made to the accompanying drawings which form a part hereof, and in which there is shown by way of illustration and not of limitation a preferred embodiment of the invention. Such embodiment does not represent the full scope of the invention, but rather the invention may be employed in different embodiments and reference is made to the claims herein for interpreting the breadth of the invention.

BRIEF DESCRIPTION OF THE DRAWINGS

FIG. 1 is a view in perspective of a chamfer tool embodying the present invention;

FIG. 2 is a plan view of the chamfer tool shown in FIG. 1;

FIG. 3 is a view in elevation with parts cut away of the chamfer tool shown in FIG. 1;

FIG. 4 is a view in elevation in half-section of the chamfer tool shown in FIG. 1;

FIG. 5 is a view in elevation of a blade for use with the chamfer tool shown in FIG. 1;

FIG. 6 is a fragmentary view in elevation with parts cut away illustrating the manner in which the chamfer tool deburrs the inner peripheral edge of the mouth of a cartridge case; and FIG. 7 is a fragmentary view in elevation with parts cut away illustrating the manner in which the chamfer tool deburrs the outer peripheral edge of the mouth of a cartridge case.

DESCRIPTION OF THE PREFERRED EMBODIMENT

Referring now to the drawings, FIGS. 1 through 4 show a chamfer tool designated generally by the numeral 10. The chamfer tool 19 is generally intended for hand-chamfering empty cartridge cases and is comprised of a hollow housing or body 11, and blade 12, and a pin or fastening means 13 for removably fastening the blade 12 to the body 11.

The hollow body 11 includes a cylindrical base 14 and an integral conical head 15 extending forwardly from the base 14. The body 11 is machined from steel and, if desired, the external surface of the cylindrical base 14 may be knurled in a diamond pattern as shown to provide a non-slippery grip for the user's fingers. The conical head 15 is in the form of a truncated cone, and is recessed at its lower end from the external surface of the cylindrical base 14 so as to provide a circumferential shoulder 16. The forward end of the conical head 15 is solid, as can be seen in FIGS. 3 and 4, and is in the form of a frustum of a right circular cone so that it may provide sufficient strength for securely fastening the blade 12 in place and for preventing chipping of fracturing of this end of the tool 10. The conical head 15 is bisected by a blade-receiving slot 17 to form a pair of opposed blade-supporting portions 18 in the form of half-sections of a truncated right circular cone. The blade-receiving slot 17 is formed along the central axis of the tool 10 and begins at the forward end of the conical head 15 and terminates at the shoulder 16 formed between the conical head 15 and cylindrical base 14. At the forward end of the conical head 15, the opposed blade-supporting portions 18 have aligned openings 19 formed therein transversely of the blade-receiving slot 17. These openings 19 extend through and are formed in the solid frustum of the forward end of the head 15.

Referring now to FIG. 5, there is shown the blade 12 for use in the hollow body 11 of the chamfer tool 10. The blade 12 is cut from a flat sheet of hardened spring steel of about 0.005 inches thick, and is substantially V-shaped. The blade 12 includes a pair of tapered legs 20 which converge forwardly at one end to define an apex 21. The apex 21 of the blade 12 has a bore 22 formed therethrough, and its forward end is cut away to present a flat surface 23. The rear or free ends of the legs 20 of the blade 12 are also cut away to define flat surfaces 24. Each leg 20 of the blade 12 has an inner edge 25 and an outer edge 26 which provide inner cutting edges and outer cutting edges for the blade 12. The inner edges 25 of the legs 20 slope at complementary angles of 25° from a point 25a located along the axis 27 of the blade 12 within the apex 21 of the blade 12. The outer edges 26 of the legs 20 slope at complementary angles of about 20° from a second point 26a along the axis 27 of the blade 12 located forwardly of the first point and above the apex 21 of the blade 12, as seen in FIG. 5. Thus, the cutting edges of the blade 12 slope at different angles from its axis 27, the purpose of which will hereinafter be described. The blade 12 may also be coated with a rust preventative to aid in protecting it from rust.

The blade 12 is disposed within the blade-receiving slot 17 such that the flat surfaces 24 of the rear of the legs 20 engage the shoulder 16 of the housing 11, and the bore 22 is in alignment with the openings 19 in the blade supporting portions 18. In this position, as shown in FIGS. 1, 3 and 4, the slope of the tapered legs 20 can be seen to be at about the same angle as the slope of the conical head 15. However, the legs 20 of the blade 12 are also wider than the wall of the conical head 15 so that the inner cutting edges 25 of the blade 12 extend inwardly beyond the inner surface of the conical head 15, and the outer edges 26 of the blade 12 extend beyond the exterior surface of the conical head 15.

The pin or fastening means 13 extends through the aligned openings 19 in the blade supporting portions 18 of the conical head 15 and the bore 22 in the apex 21 of the blade 12 to securely fasten the blade 12 in place within the blade-receiving slot 17. The pin 13 is of the expandable roll pin or spring pin type and thus must first be squeezed slightly before inserting it through the aligned bore 22 and openings 19. Once the pin 13 is within the bore 22 and openings 19 it expands slightly so that a tight friction fit is provided. The pin 13, however, may easily be removed by forcing it out of the bore 22 and openings 19 with a punch or similar tool.

Referring now to FIGS. 6 and 7, the operation and use of the invention will now be described. FIG. 6 shows an empty cartridge case 28 having a mouth 29 with an inner peripheral edge 30 in position to be chamfered and deburred by the tool 10. The forward end of the tool 10 is inserted within the mouth 29 of the cartridge case 28 until the outer cutting edges 26 of the blade 12 bear against the inner peripheral edge 30 of the mouth 29. The tool 10 is then forced toward the cartridge case 28 and simultaneously rotated so that the outer cutting edges 26 of the blade 12 cut the burrs and bevel the inner peripheral edge 30 of the mouth 29 of the cartridge case 28. The tool 10 may then be reversed, as shown in FIG. 7, to chamfer and deburr the outer peripheral edge 31 of the mouth 29 of the cartridge case 28. In this position, the mouth 29 of the cartridge case 28 is inserted into the opposite end of the tool 10 so that the hollow cylindrical base 14 and conical head 15 is telescoped over the mouth 29 of the cartridge case 28 until the inner cutting edges 25 of the blade 12 bear against the outer peripheral edge 31 of the mouth 29. Then by forcing the tool 10 toward the cartridge case 28 and simultaneously rotating it the outer peripheral edge 31 of the mouth 29 of the cartridge case 28 is deburred and beveled.

After extended use of the tool 10 for chamfering and deburring cartridge cases, the inner and outer cutting edges 25,26 of the blade 12 will become worn and it will become necessary to replace the blade 12. This can easily be performed by removing the pin 13 by forcing it out of the aligned openings 19 and bore 22 with a punch or similar tool. The worn blade may then be removed from the slot 17 and a new blade inserted therein. This new blade can then be fastened in place by squeezing the pin 13 and inserting it through the aligned openings 19 and bore 22. The tool 10 is then once again ready for chamfering and deburring empty cartridge cases.

A chamfer tool 10 has been shown and described for chamfering the inner and outer peripheral edges 30,31 of the mouth 29 of an empty cartridge case 28. The tool 10 is comprised of a hollow body 11 including a cylindrical base 14 and an integral conical head 15 extending forwardly therefrom bisected by a blade receiving slot 17. Aligned openings 19 are formed therein at its forward end transversely of its blade receiving slot 17. A replaceable V-shaped blade 12 is disposed in the blade receiving slot 17 including a pair of tapered legs 20 converging to an apex 21 having a bore 22 formed therethrough in alignment with the openings 19 in a conical head 15. A pin 13 extends through the aligned bore 22 and openings 19 for removably fastening the blade 12 within the blade-receiving slot 17. It is apparent, however, that various modifications may be made from the specific structure described. Although it is contemplated that the chamfer tool 10 will be fabricated in relatively small sizes for manual use in hand-chamfering the mouth of a cartridge case, the tool 10 may also be adapted for use on a machine. The chamfer tool 10 may also be fabricated in a wide variety of sizes and diameters without departing from the invention. The slope of the inner and outer cutting edges 25,26 of the blade 12 used with the tool 10 may also vary according to ones particular application. Further, although the blade 12 if preferably constructed of hardened spring steel, it may also be constructed from other suitably metal, and its thickness may vary according to the desired use. Also, fastening means other than the pin 13 may be used to secure the blade 12 within the housing 11. For example, a self-threading screw might be used and it is therefore not intended to limit the invention to the fastening means shown herein.

I claim:

1. A tool for chamfering the peripheral edges of the mouth of an empty cartridge case, comprising:
    a hollw body including a cylindrical base, and an integral conical head extending forwardly from the base which is recessed at its lower end from the external surface of said base to provide a circumferential shoulder therebetween,
    said conical head includes a solid forward end in this form of a frustum of a right circular cone and said head is bisected by a blade-receiving slot extending from said shoulder through its forward end to form a pair of opposed blade-supporting portions,
    said forward end includes aligned openings formed therethrough transversely of said blade-receiving slot;
    a V-shaped blade disposed in said blade-receiving slot, said blade including a pair of tapered legs which taper at about the same angle as the slope of the conical head, and extend beyond the surfaces of said conical head to present outer cutting edges for chamfering the interior peripheral edge of the mouth of the cartridge case, and inner cutting edges for chamfering the exterior peripheral edge of the mouth of the cartridge case,
    said tapered legs converge to define an apex having a bore formed therethrough in alignment with the openings in said forward end of said head and include flat rear ends which engage said shoulder of said body; and
    a removable pin extending through said aligned bore and openings for removably fastening said blade within said blade-receiving slot.

2. A chamfer tool in accordance with claim 1, wherein:
    said cylindrical base is knurled on its external surface to provide a non-slippery grip.